(12) United States Patent
Tamura

(10) Patent No.: US 6,557,088 B2
(45) Date of Patent: Apr. 29, 2003

(54) INFORMATION PROCESSING SYSTEM AND RECORDING MEDIUM RECORDING A PROGRAM TO CAUSE A COMPUTER TO EXECUTE STEPS

(75) Inventor: Takayuki Tamura, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/196,184

(22) Filed: Jul. 17, 2002

(65) Prior Publication Data

US 2002/0174294 A1 Nov. 21, 2002

Related U.S. Application Data

(62) Division of application No. 09/407,723, filed on Sep. 28, 1999, now Pat. No. 6,457,087.

(30) Foreign Application Priority Data

Mar. 30, 1999 (JP) .......................................... 11-087627
Jul. 6, 1999 (JP) .......................................... 11-191192

(51) Int. Cl.[7] ............................................. G06F 13/18
(52) U.S. Cl. ..................................................... 711/158
(58) Field of Search .................................. 711/151, 158

(56) References Cited

U.S. PATENT DOCUMENTS

| | | | | |
|---|---|---|---|---|
| 4,642,758 A | * | 2/1987 | Teng .......................... | 364/200 |
| 5,644,786 A | * | 7/1997 | Gallagher et al. ........... | 395/850 |
| 5,752,193 A | * | 5/1998 | Scholefield et al. ......... | 455/452 |
| 6,038,601 A | * | 3/2000 | Lambert et al. ............. | 709/226 |
| 6,393,506 B1 | * | 5/2002 | Kenny ......................... | 710/113 |
| 6,412,048 B1 | * | 6/2002 | Chauvel et al. .............. | 711/158 |

FOREIGN PATENT DOCUMENTS

| | | |
|---|---|---|
| JP | 8-314842 | 11/1996 |
| JP | 8-328933 | 12/1996 |

OTHER PUBLICATIONS

Kamel et al., "A Study on Scheduling Multiple Priority Requests in Multimedia Servers", IEEE pp. 395–399.*
Aret et al., "Disk Scheduling in Video Editing Systems", 2001, IEEE, pp. 933–950.*

* cited by examiner

*Primary Examiner*—Kevin L. Ellis
(74) *Attorney, Agent, or Firm*—Leydig, Voit & Mayer, Ltd.

(57) ABSTRACT

An information processing system which has a disk buffer for temporarily storing data items read from a disk unit, a block processing order determination module for detecting, from a processing request for requesting data items stored on the disk unit, a data item matching the data stored in the disk buffer from the data items requested in the processing request and determining the read order of the data item matching and the remaining data requested in the processing request so that the data item matching is read before the remaining data, and a read module for reading the data item matching from the disk buffer before reading the remaining data into the disk buffer from the disk unit in accordance with the read order determined by the block processing order determination module.

7 Claims, 15 Drawing Sheets

FIG. 3

51a: UNPROCESSED BLOCK NUMBER LIST

| TOP BLOCK NUMBER | NUMBER OF BLOCKS |
|---|---|
| 70 | 30 |
| 102 | 40 |
| 150 | 10 |
| - | 0 |
| - | - |

58: PREREAD QUERY POINTER LIST

| TASK NUMBER | PREREAD QUERY POINTER |
|---|---|
| T1 | 5 |
| T3 | 4 |
| T2 | 3 |
| - | 0 |
| - | - |

72: PREREAD REQUEST QUERY

| TOP BLOCK NUMBER | NUMBER OF BLOCKS | FILE NUMBER |
|---|---|---|
| 70 | 30 | F2 |
| 102 | 40 | F2 |
| 150 | 10 | F2 |
| 0 | 70 | F2 |
| - | - | - |

720: PREREAD REQUEST 721 722 723

INFORMATION PROCESSING SYSTEM AND RECORDING MEDIUM RECORDING A PROGRAM TO CAUSE A COMPUTER TO EXECUTE STEPS

BACKGROUND OF THE INVENTION

1. Field of the Invention

This invention relates to an information processing system for reading data from a large-capacity storage unit through a data buffer and, for example, to a database system for processing a query on a database on a disk unit.

2. Description of the Related Art

The performance of a database system for processing queries on a database file on a disk unit is limited by the data transfer wait time from the disk unit rather than the processing capability of a central processing unit (CPU). Thus, various methods are designed, such as a method of providing a buffer for retaining disk blocks making up a file for decreasing the actual number of input/output times from/to a disk unit and a method of previously reading necessary disk blocks into memory.

FIG. 16 is a chart to show a file access control system shown on "Implementation and performance of integrated application—controlled file caching, prefetching, and disk scheduling," an article appearing on pages 311 to 343 of issue 4 of vol. 14 of ACM Transactions on Computer Systems published in November 1996, for example In FIG. 16, numerals 4a and 4b denote query processing tasks, numeral 6 denotes a disk unit for storing a file, numeral 71 denotes a disk input/output control module for performing physical input/output from/to the disk unit, numeral 91 denotes a preread module for reading a block from the disk unit prior to a request issued from the query processing task, and numeral 92 denotes a buffer module for retaining the block read from the disk unit on memory.

FIG. 17 is a timing chart to show a time sequence applied when the query processing task 4a executes query processing. In the figure, the horizontal axis represents the time. Numerals 40a and 60 represent a data processing sequence of the query processing task 4a and a data transfer sequence of the disk unit 6 respectively. Numerals B1 and B2 denote numbers of disk blocks and numerals t21, t22, t23, and t24 denote timings. Numeral 41a represents the time taken for the query processing task 4a to process one block read into the memory and numeral 61 represents the time taken for the disk unit 6 to transfer one block.

At timing t21, the query processing task 4a starts execution, notifies the preread module 91 of the accessed disk block order, B1, B2, . . . , and waits for the first block B1 to be read. The preread module 91 instructs the disk input/output control module 71 to read the first block B1 in accordance with the block order indicated from the query processing task 4a, and the disk unit 6 starts to transfer the block B1. At timing t22, the transfer of the block B1 from the disk unit is complete, the query processing task 4a processes the data in the block, the preread module 91 instructs the disk input/output control module 71 to read the second block B2, and the disk unit 6 starts to transfer the block B2.

At timing t23, upon completion of processing the block B1, the query processing task 4a waits for the second block B2 to be read. At timing t24, the transfer of the block B2 from the disk unit is complete, the query processing task 4a processes the data in the block, and the preread module 91 instructs the disk input/output control module 71 to read the next block. This processing is repeated until completion of processing all blocks in the file.

Thus, using the block access order indicated by the query processing task 4a, the preread module 91 can start block read without waiting for a block access request issued from the query processing task 4a, so that the wait time of the query processing task 4a can be made shorter than the block transfer time 61 of the disk unit 6 with respect to any other block than the first block B1.

In the file access system in the related art as described above, the disk block transfer order between the disk unit and the buffer can be changed, but the disk block transfer order between the buffer and the task cannot be changed. Thus, even if two or more tasks make sequential access to the same file at the same time, the disk block accessed at the same time is not necessarily the same. Thus, for a file larger than the buffer capacity, the possibility that the disk block accessed by one task may remain on the buffer until it is accessed by another task is low; the buffering effect cannot be produced.

SUMMARY OF THE INVENTION

It is therefore an object of the invention to provide an information processing system wherein a buffer can be used efficiently even if a plurality of query processing tasks access a large-capacity database file at the same time.

According to the invention, there is provided an information processing system comprising buffer storage means for temporarily storing a plurality of data pieces read from a storage unit, order determination means for detecting from a processing request for requesting a plurality of data pieces stored on the storage unit, the data piece matching the data stored in the buffer storage means among the data pieces requested in the processing request and determining the read order of the match data piece and the remaining data requested in the processing request so as to read the match data piece preceding the remaining data, and read means for reading the match data piece from the buffer storage means before reading the remaining data into the buffer storage means from the storage unit in accordance with the read order determined by the order determination means.

The storage unit is a disk unit, the read means reads the remaining data into the buffer storage means from the disk unit after reading the match data piece, and the information processing system further includes transmission means for transmitting the remaining data after transmitting the match data piece read by the read means from the buffer storage means.

According to the invention, there is provided an information processing system comprising a disk unit with a storage area divided into a plurality of blocks, buffer storage means for storing a plurality of blocks read from the disk unit, first processing means for accepting a first processing request for requesting a plurality of data pieces stored on the disk unit, detecting a plurality of blocks storing the data pieces requested in the first processing request based on the first processing request, and reading the data in the detected blocks from the buffer storage means, second processing means for accepting a second processing request for requesting a plurality of data pieces stored on the disk unit, detecting a plurality of blocks storing the data pieces requested in the second processing request based on the second processing request, and reading the data in the detected blocks from the buffer storage means, detection means for detecting a block common to the first and second processing requests among the blocks stored in the buffer storage means, and buffer management means, to erase the data contained in the common block detected by the detection means from the buffer storage means, for erasing the data after the data to be erased is read by both the first and second processing means.

The buffer management means comprises preread means for reading the data in the blocks detected by the first processing means and data in a block specified in a read request received from the outside from the disk unit and stores the read data in the buffer storage means, and the detection means specifies a block not common to the blocks related to the first processing request without specifying the common block among the blocks detected by the second processing means and outputs to the preread means as the read request.

The buffer storage means stores the data pieces requested in the first and second processing requests in a first-in first-out shared queue, the preread means stores the data in the common block read from the disk unit in the queue, the first processing means reads the data requested in the first processing request based on a first pointer for pointing to one location in a storage area of the queue, and the second processing means reads the data requested in the first processing request based on a second pointer for pointing to one location in the storage area of the queue.

According to the invention, there is provided an information processing system comprising buffer storage means for temporarily storing a plurality of common data pieces to a plurality of processing requests, read means for reading new data from a storage unit, and buffer management means for substituting the new data for the common data having been processed for the processing requests without substituting the new data for unprocessed common data having not yet been processed for at least one of the processing requests among the common data pieces stored in the buffer storage means.

The buffer management means stops writing into the buffer storage means if all common data pieces stored in the buffer storage means are unprocessed command data and an empty storage area is not available.

According to the invention, there is provided an information processing system comprising priority determination means for accepting a first processing request for requesting data and a second processing request for requesting a smaller amount of data than that in the first processing request and assigning a high priority to the second processing request involving a smaller data amount between the first and second processing requests and a lower priority than that of the second processing request to the first processing request involving a larger data amount as compared with the second processing request based on the data amounts of the data requested in the first and second processing requests, and read means for reading the data in the processing request assigned the high priority from a storage unit taking precedence over data in any other processing request based on the priorities.

The priority determination means determines the priority of the first processing request based on a predetermined data amount and the data amount involved in the first processing request and the priority of the second processing request based on the predetermined data amount and the data amount involved in the second processing request.

If the priority determination means accepts the second processing request later while the read means reads the first processing request, it again determines the priorities from the beginning, and the read means interrupts reading of the data requested in the first processing request and reads the data requested in the second processing request based on the priorities again determined by the priority determination means, and restarts reading of the data requested in the first processing request after completion of reading the data requested in the second processing request.

The first and second processing requests are requests for accessing different files, and the read means reads the file related to the first processing request and the file related to the second processing request based on the priorities.

According to the invention, there is provided a recording medium recording a program for causing a computer to execute the acceptance step of accepting a processing request for requesting a plurality of data pieces on a storage unit, the determination step of determining whether or not data matching the data requested in the processing request is stored in buffer storage means for temporarily storing data read from the storage unit, the first read step of reading the match data from the buffer storage means based on the determination result at the determination step, the second read step of reading an unread data piece of the data pieces requested in the processing request into the buffer storage means from the storage unit after termination of the first read step, and the third read step of reading the data piece read at the second read step from the buffer storage means.

The recording medium records the program for causing the computer to further execute the first transmission step, wherein processing is started between the first and second read steps, of transmitting the data read at the first read step to the requesting party making the processing request, and the second transmission step of transmitting the data read at the third read step to the requesting party.

According to the invention, there is provided a recording medium recording a program for causing a computer to execute the acceptance step of accepting a plurality of processing requests, the first storage step of reading common data to the processing requests from a storage unit and storing the common data in buffer storage means for temporarily storing data, the fourth read step at which a first task for processing one of the processing requests reads the common data stored at the first storage step from the buffer storage means, the fifth read step at which a second task for processing one of the processing requests reads the common data stored at the first storage step from the buffer storage means, and the sixth read step being executed after termination of the first storage step, of sensing whether or not the fourth and fifth read steps terminate, if the fourth and fifth read steps terminate, the sixth read step of reading data from the storage unit and substituting the data read from the storage unit for the common data stored in the area of the buffer storage area, if the fourth and fifth read steps do not terminate, the sixth read step of temporarily stopping the substituting of the data.

The acceptance step comprises the first acceptance step of accepting a first processing request as one of the processing requests, the first request step of making a request for reading data related to the first processing request accepted at the first acceptance step, the second acceptance step being executed after the first acceptance step, of accepting a second processing request as one of the processing requests, and the second request step of making a request for reading a data piece of a plurality of data pieces related to the second processing request accepted at the second acceptance step, not matching the data related to the first processing request, and the sixth read step includes reading the data requested at the first and second request steps into the buffer storage means from the storage unit.

According to the invention, there is provided a recording medium recording a program for causing a computer to execute the first acceptance step of accepting a first processing request for requesting data, the seventh read step of reading data related to the first processing request into buffer storage means from a disk unit, the second acceptance step of accepting a second processing request for requesting data during execution of the seventh read step, the comparison step being executed after the second acceptance step, of comparing the data amount involved in the first processing request with that in the second processing request in magnitude, the eighth read step of interrupting the seventh read step, reading data related to the second processing request from the disk unit, and transmitting the read data to the requesting party making the second processing request if the data amount involved in the second processing request is smaller than that in the first processing request based on the comparison result at the comparison step, and the ninth read step being executed after termination of the eighth read step, of restarting execution of the seventh read step interrupted.

The second processing request is a processing request for accessing a plurality of files, the comparison step includes sorting a file related to the first processing request and the files related to the second processing request according to the access order in the ascending order of file sizes of the files, the eighth read step includes reading the files related to the second processing request into the buffer storage means from the disk unit in accordance with the access order and transmitting data in the read files to the requesting party, and even if the eighth read step is not yet complete, if the eighth read step accesses a file common to the first processing request, the ninth read step reads data in the common file from the buffer storage means.

At the eighth read step, an unprocessed block of a plurality of blocks in the common file is read taking precedence over other blocks into the buffer storage means from the disk unit by a task for processing the first processing request and then a block unprocessed for the second processing request is read into the buffer storage means from the disk unit.

BRIEF DESCRIPTION OF THE DRAWINGS

FIG. 3 is a memory map to show an unprocessed block number list in the first embodiment of the invention;

FIG. 8 is a memory map to show a preread queue pointer list in the second embodiment of the invention;

FIG. 9 is a memory map to show a preread request queue in the second embodiment of the invention;

DETAILED DESCRIPTION OF THE PRESENT INVENTION

Figure 1:
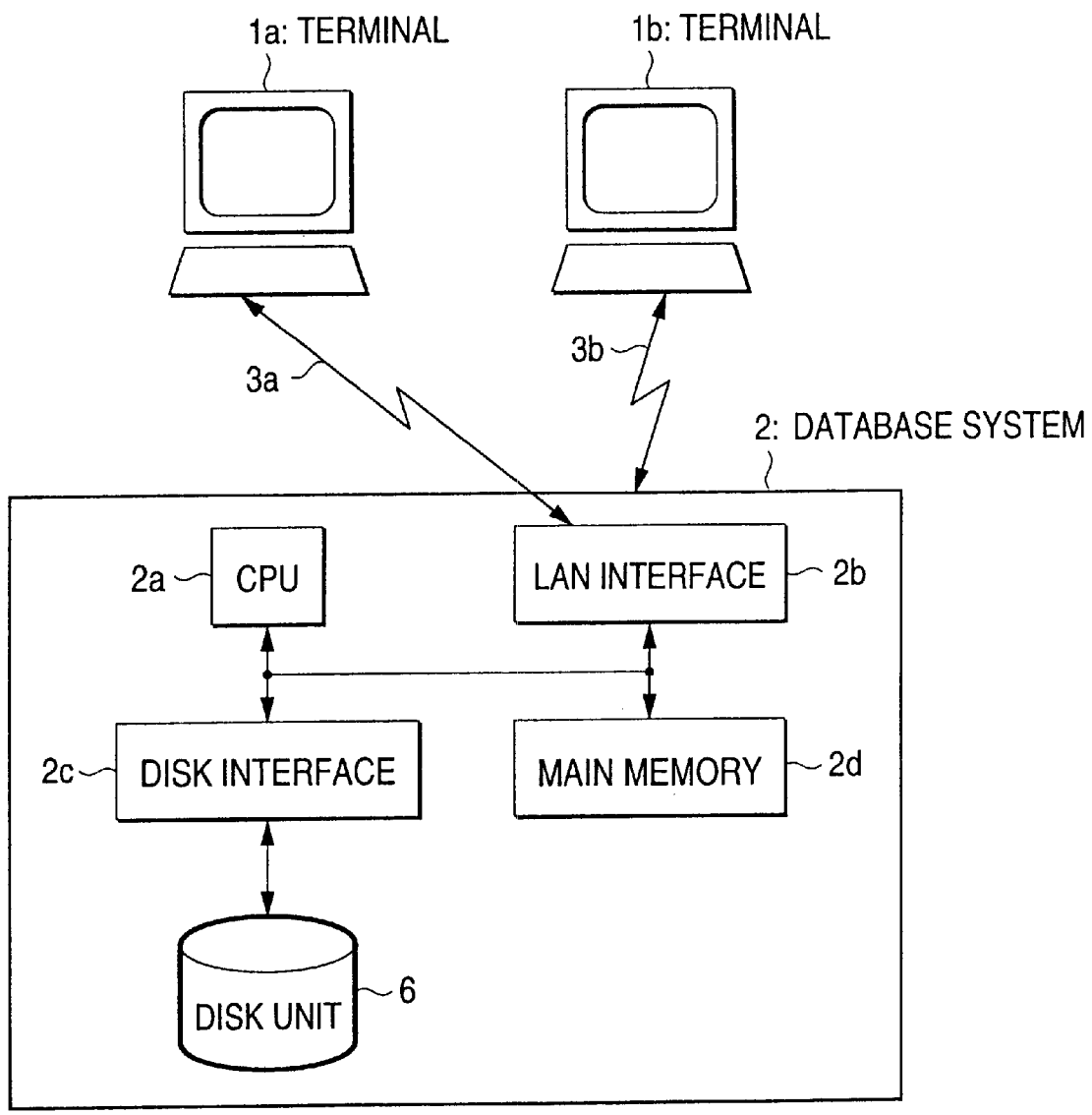
FIG. 1 is a functional block diagram of a database system in a first embodiment of the invention.

The present invention will be described in detail with reference to the accompanying drawings.
First embodiment FIG. 1 is a functional block diagram to show a database system according to an information processing system incorporating the invention. In the figure, numerals 1a and 1b denote terminals; for example, known personal computers, mobile communication terminals, etc., can be used as the terminals 1a and 1b. Numeral 2 denotes a database system; any computer having a communication function can be used. For example, it is a server wherein Windows NT of Microsoft Corporation is installed as an operating system. Numerals 3a and 3b denote access lines for connecting the terminals 1a and 1b and the database system 2; the access lines 3a and 3b are communication lines of wired communication, wireless communication, etc. For example, known local area network (LAN) lines can be used. Numeral 6 denotes a disk unit of a large-capacity storage unit for storing data in a database in block units.

Numeral 2a denotes a CPU, which is a processor of the database system 2, and numeral 2b denotes a LAN interface connected to the CPU 2a by a bus for serving as a communication interface with the access lines 3a and 3b. The CPU 2a, which is a processor, performs all processing shown in FIGS. 4, 6, and 10-13 described later. However, in a system that can perform distributed processing using more than one processor or unit, the processing described later can also be distributed among the processors or units for execution. Numeral 2c denotes a disk interface serving as an interface between the disk unit 6 and the CPU 2a when the disk unit 6 is accessed; for example, a known SCSI interface board, etc., can be used as the disk interface 2c. Numeral 2d denotes main memory for storing a disk buffer 53, a program, and variables and lists required for executing the program. The database system 2 has the CPU 2a, the LAN interface 2b, the disk interface 2c, the main memory 2d, and the disk unit 6.

The database system in the first embodiment of the invention differs from the system in the related art in that it comprises software for determining the block processing order in a file independently of a query processing task.

Figure 2:
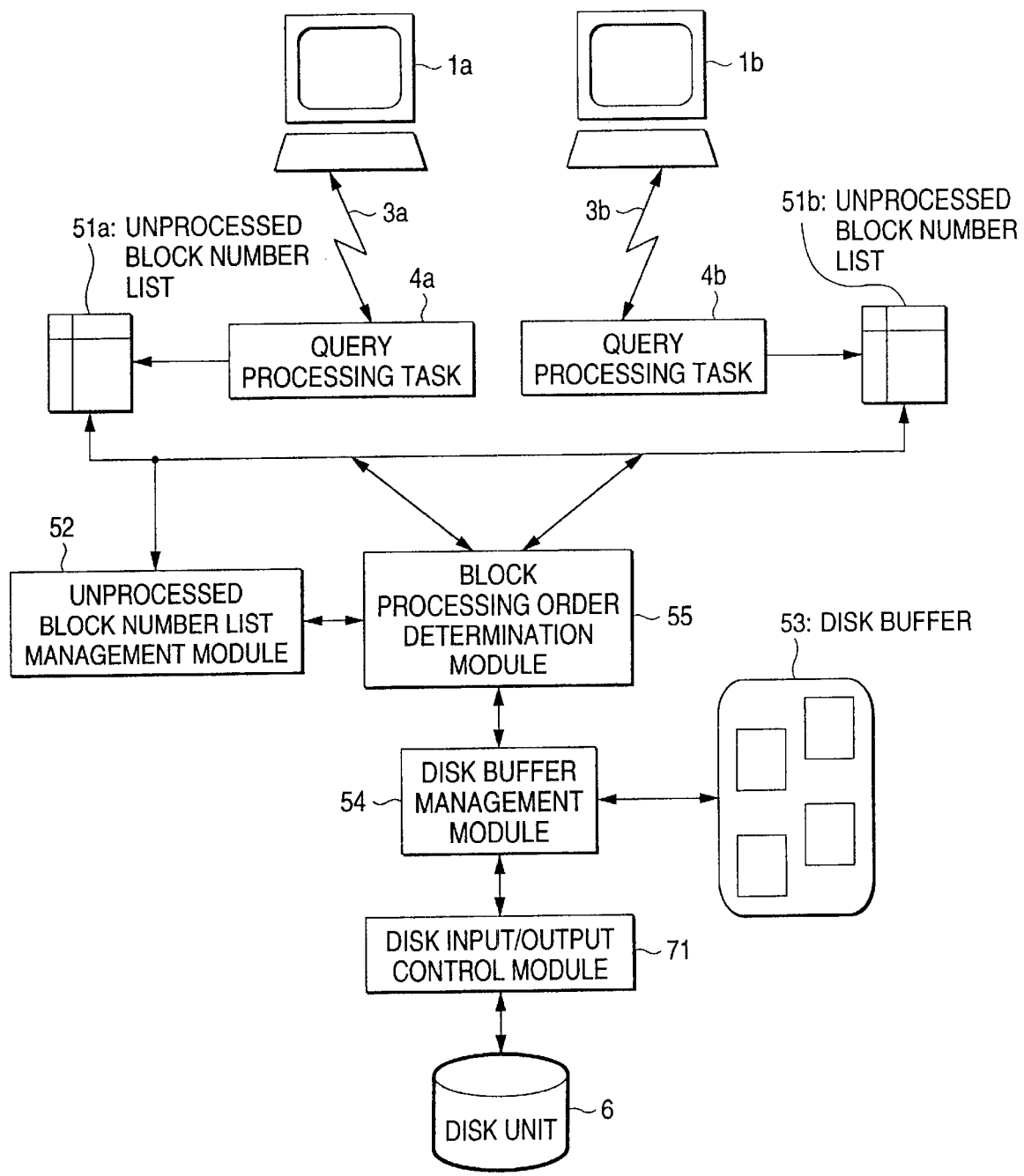
FIG. 2 is a functional block diagram of the database system in the first embodiment of the invention.

FIG. 2 is a functional block diagram to show the configuration in FIG. 1 in more detail. In FIG. 2, numerals 4a and 4b denote query processing tasks started from the terminals 1a and 1b over the access lines 3a and 3b respectively. Numerals 51a and 51b denote unprocessed block number lists for recording unprocessed block numbers in files accessed by the query processing tasks 4a and 4b respectively. Numeral 52 denotes an unprocessed block number list management module for updating the unprocessed block number lists 51a and 51b each time the query processing tasks 4a and 4b process a block. Numeral 53 denotes a disk buffer for retaining some of blocks on the disk unit 6 in the main memory 2d. Numeral 54 denotes a disk buffer management module for managing the disk buffer 53. Numeral 55 denotes a block processing order determination module for determining the block numbers of the blocks to be next processed by the query processing tasks 4a and 4b based on the state of the unprocessed block number lists 51a and 51b and the disk buffer 53. Numeral 71 denotes a disk input/output control module for controlling physical input/output from/to the disk unit 6; the disk input/output control module 71 is a disk driver of the disk interface 2c in FIG. 1.

The query processing tasks 4a and 4b, the unprocessed block number list management module 52, the disk buffer management module 54, the block processing order determination module 55, and the disk input/output control module 71 are software executed by the CPU 2a and are stored in the main memory 2d. The query processing tasks 4a and 4b are processed in parallel in separate threads or processes and the disk buffer management module 54 and the block processing order determination module 55 are common routines called in the threads or processes.

The unprocessed block number lists 51a and 51b and the disk buffer 53 are stored in the main memory 2d as shared memory so that data can be exchanged among threads or processes. FIG. 3 is a drawing to show an example of the unprocessed block number list 51a. The unprocessed block number list 51a stores a pair of a top block number 511 and the number of blocks 512 for each area containing consecutive blocks.

Here, the disk buffer 53 is an example of buffer storage means, the block processing order determination module 55 is an example of order determination means, and each of the query processing tasks 4a and 4b is an example of read means. The disk unit 6 is an example of a storage unit, but the storage unit is not limited to a disk unit and may be any storage unit if it stores large-capacity information as compared with buffer storage means. Requests processed in the query processing tasks 4a and 4b are an example of processing requests, and are query processing, etc., described in a known SQL (structured query language).

Next, the operation of the database system of the first embodiment will be discussed with reference to FIGS. 4 and 5.

Figure 4:
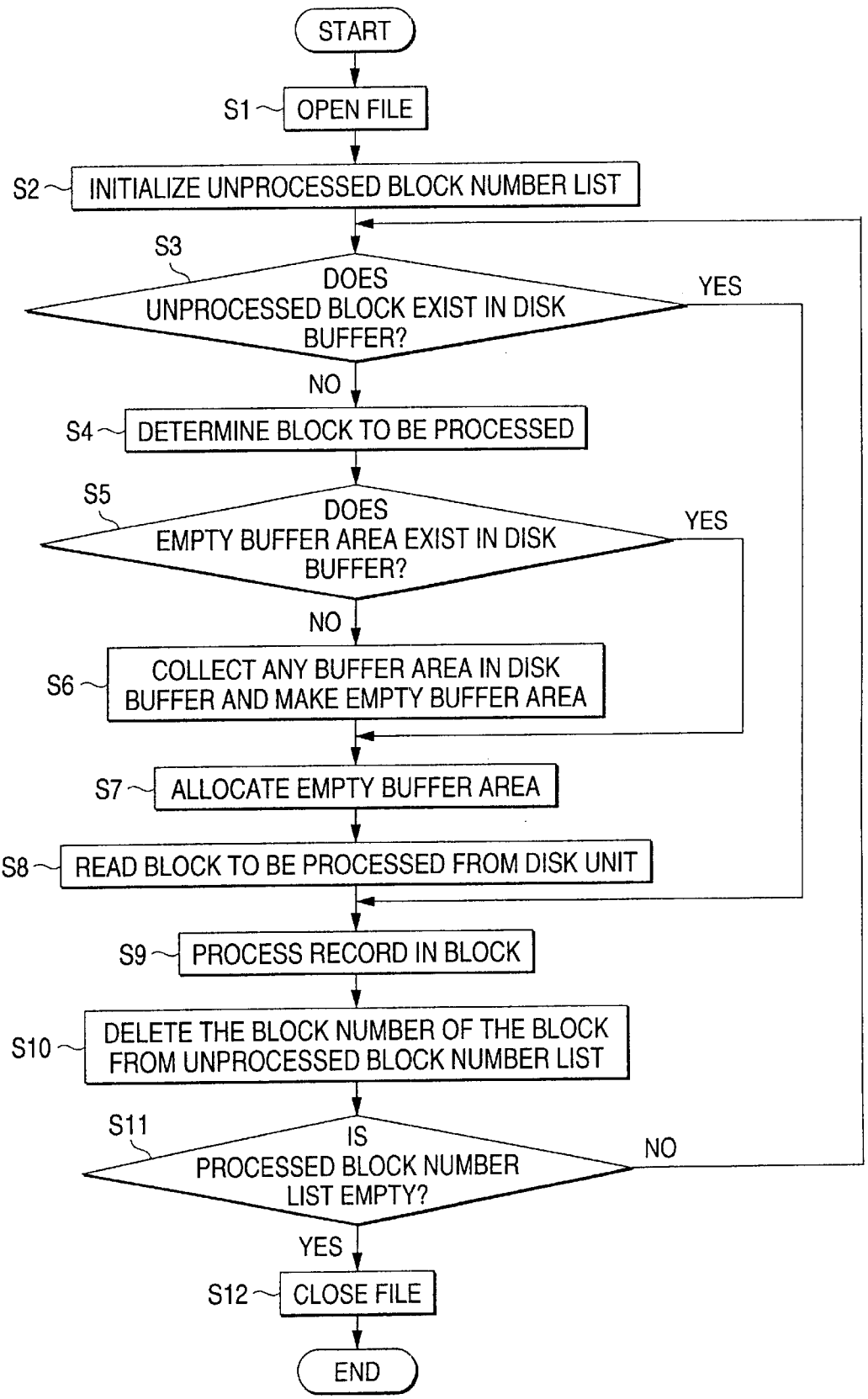
FIG. 4 is a flowchart to describe read processing in the first embodiment of the invention.

FIG. 4 is a flowchart to describe the operation of the database system shown in FIG. 2. First, at acceptance step S1 in FIG. 4, the query processing task 4a accepts query processing, which is a processing request, from the terminal 1a or 1b, it searches for a file requested in the query processing and opens the file to perform database file processing by reading management information of the block numbers, etc., of the file through the disk input/output control module 71.

Next, at step S2, the query processing task 4a sets a set of the block numbers required for the query processing in the file in the unprocessed block number list 51a. For example, the query processing task 4a sets the block number set as shown in FIG. 3. If the block numbers required for the query processing are unknown, all block numbers of the file are set in the unprocessed block number list 51a.

At determination step S3, when the query processing task 4a makes a request for reading a block, the block processing order determination module 55 determines whether or not the disk buffer 53 contains a buffer area storing the contents of the block matching a block number in the unprocessed block number list 51a. If unprocessed block exists in the disk buffer 53, control goes to step S9. If no unprocessed block exists in the disk buffer 53, control goes to step S4 at which the block processing order determination module 55 selects any block number out of the unprocessed block number list 51a, determines the block having the selected block number to be the next block to be processed, and requests the disk buffer management module 54 to read the block from the disk unit 6.

Next, at step S5, upon reception of the block read request from the block processing order determination module 55, the disk buffer management module 54 determines whether or not an empty buffer area for reading the block exists in the disk buffer 53. If an empty buffer area exists, control goes to step S7. If no empty buffer area exists, control goes to step S6 at which the disk buffer management module 54 collects one buffer area being used in the disk buffer 53 and prepares an empty buffer area.

Next, at step S7, the disk buffer management module 54 allocates one empty buffer from the disk buffer 53 for reading data. At step S8, the disk buffer management module 54 requests the disk input/output control module 71 to read the block to be processed into the allocated empty buffer from the disk unit 6 and waits for the read to complete, then notifies the block processing order determination module 55 of the completion of the read.

At step S9, the block processing order determination module 55 reads the contents of the unprocessed block existing in the disk buffer 53 or the new unprocessed block read from the disk unit, namely, the read data in either of the unprocessed blocks and returns the read data to the query processing task 4a. Upon reception of the data, the query processing task 4a performs query processing on the block based on the received data.

Next, at step S10, the unprocessed block number list management module 52 deletes the block number of the block processed at step S9 from the unprocessed block number list 51a.

At step S11, the block processing order determination module 55 determines whether or not the unprocessed block number list 51a is empty and if the unprocessed block number list 51a is not empty, the block processing order determination module 55 returns to step S3 and continues processing. If the unprocessed block number list 51a is empty, control goes to step S12 at which the query processing task 4a closes the file and terminates the processing for the file. This described processing sequence is repeated for each of the files processed in each query processing task. Therefore, the query processing task 4b also performs processing similar to that of the query processing task 4a as previously described with reference to FIG. 4.

Next, the operation performed when the query processing task 4b starts query processing while the query processing task 4a is performing query processing will be discussed with reference to FIG. 5, which is a time sequence chart. In the figure, numerals 40a and 40b denote block processing sequences of the query processing tasks 4a and 4b respectively. Numeral 41a (41b) denotes the time taken for the query processing task 4a (4b) to process one block read into the disk buffer 53. Numeral 42 denotes the time taken in reading one block into the disk buffer 53 from the disk unit 6 and t1, t2, t3, and t4 denote timings.

At timing t1, the query processing task 4a is processing one file. At the same timing t1, the database system accepts new query processing and the query processing task 4b starts processing. Here, assume that the query processing started by the query processing task 4b is a processing request for the same file as the file being processed by the query processing task 4a.

In the time period from timing t1 to timing t2, the query processing task 4a reads a block into the disk buffer 53 from the disk unit 6 and processes the block and the query processing task 4b reads the blocks already existing in the disk buffer 53 in order and executes processing. In the query processing of the query processing task 4b, the data stored in the disk buffer 53 is first read as previously described at steps S3 and S9 in FIG. 4 independently of the order of the block numbers of the data requested. Here, the query processing task 4b reads first the data already read into the disk buffer 53 by the query processing task 4a. Therefore, the query processing task 4b need not wait for data transfer from the disk unit 6. Thus, the time taken in processing one block is the time 41b and the query processing task 4b advances processing at high speed as compared with the query processing task 4a requiring (time 41a+time 42) for processing one block and completes processing all blocks in the disk buffer 53 at timing t2. Symbol t1b in FIG. 5 denotes an example of the execution timing of the first read step. In this example, the first read step is executed by the query processing task 4b which reads data from the disk buffer 53 at step S9 in FIG. 4. When the first read step terminates, the query processing task 4b processes the processing request based on the read data and as the first transmission step, transmits the processing result to the requesting terminal 1b transmitting the processing request. The processing result contains the data read at the first read step. If the first transmission step is executed before the third read step described later is executed, the processing requester can receive data before all data is read from the disk unit 6 and can start processing early. If the first transmission step is started before the second read step described later is executed, the processing requester can receive data earlier. Therefore, it is advisable to execute the first transmission step, for example, at step S9 in FIG. 4. The first transmission step may be executed in such a manner that when data in more than one block accumulates, the data is transmitted in batch.

If the result cannot be produced until all data has been read as in totalization of all data, the first transmission step may be executed after the third read step is executed.

Although the description has been given centering on the query processing task 4b, similar processing is also performed with respect to the query processing task 4a.

Since the query processing task 4b first reads common data taking precedence over any other data relative to the time while the data involved in the query processing task 4a remains in the disk buffer 53, the disk buffer 53 can be used efficiently and the physical access made between the disk buffer 53 an the disk unit 6 can be lessened. Assuming that data is read in the block number order of query processing as in the related art, if common data exists between the query processing tasks 4a and 4b, the tasks 4a and 4b do not match in processing timing and the common data read into the disk buffer 53 by the query processing task 4a will be replaced with the later read data. Then, an event occurs in which the disk input/output control module 71 must again read the common data into the disk buffer 53 from the disk unit 6 for the query processing task 4b; physical access to the disk unit 6 often occurs.

In the time period from timing t2 to timing t3, after waiting for data transfer from the disk unit 6, the query processing tasks 4a and 4b process one buffer area in order. That is, here, the data involved in the query processing task 4b and not yet placed in the diskbuffer 53 is processed. While the query processing task 4b performs processing, the next process block can be read. Thus, the average time required for processing one block is (time 41a+time 42) and is the same as that applied when the query processing task 4a performs processing solely. At timing t3, the query processing task 4a completes processing of all blocks.

Figure 5:
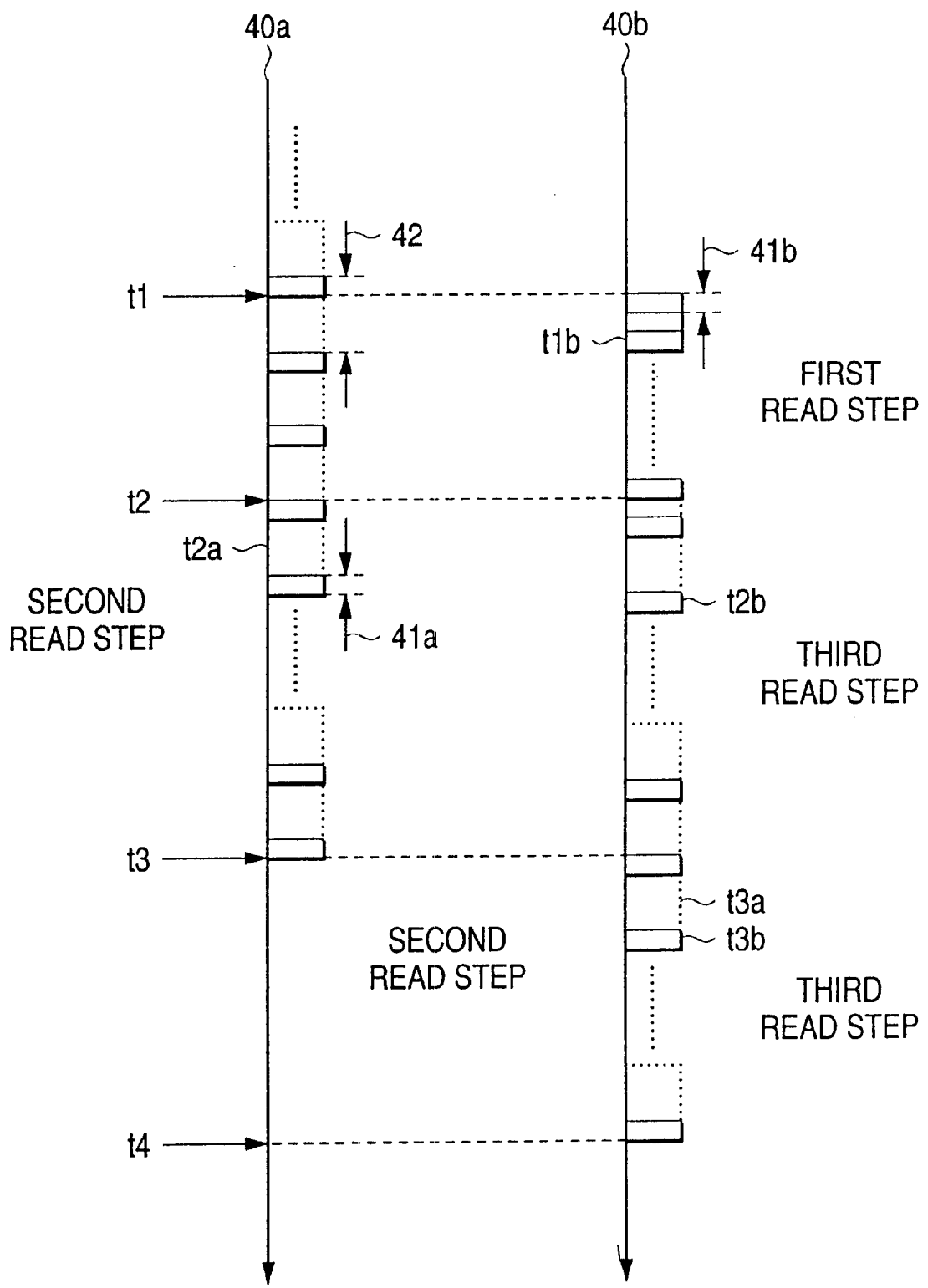
FIG. 5 is a sequence chart to describe read processing in the first embodiment of the invention.

Here, t2a or t3a in FIG. 5 denotes an example of the execution timing of the second read step. In this example, the second read step is executed by the disk input/output control module 71 which reads data into the disk buffer 53 from the disk unit 6 at step S8 in FIG. 4.

In the time period from timing t3 to timing t4, the query processing task 4b performs processing solely. It reads blocks not processed between timing t1 and timing t3 into the disk buffer 53 from the disk unit 6 in order and completes processing of all blocks at timing t4.

Here, t2b or t3b in FIG. 5 denotes an example of the execution timing of the third read step. In this example, the third read step is executed by the query processing task 4b which reads data from the disk buffer 53 at step S9 in FIG. 4. In the timing indicated by t3b after the data read at the third read step is processed by the query processing task 4b, the query processing task 4b transmits the data to the requester issuing the processing request and executes the second transmission step. When the third read step is executed by the query processing task 4a, the second transmission step is executed by the query processing task 4a.

As described above, in the first embodiment, particularly the unprocessed block number lists, the disk buffer, and the block processing order determination module for determining the next block to be processed based on the state of the unprocessed block number lists and the disk buffer are provided. Thus, if more than one query request is issued to the same file at the same time, physical data transfer to and from the disk unit can be reduced and processing can be performed with the minimum necessary disk access.

Second Embodiment

Figure 6:
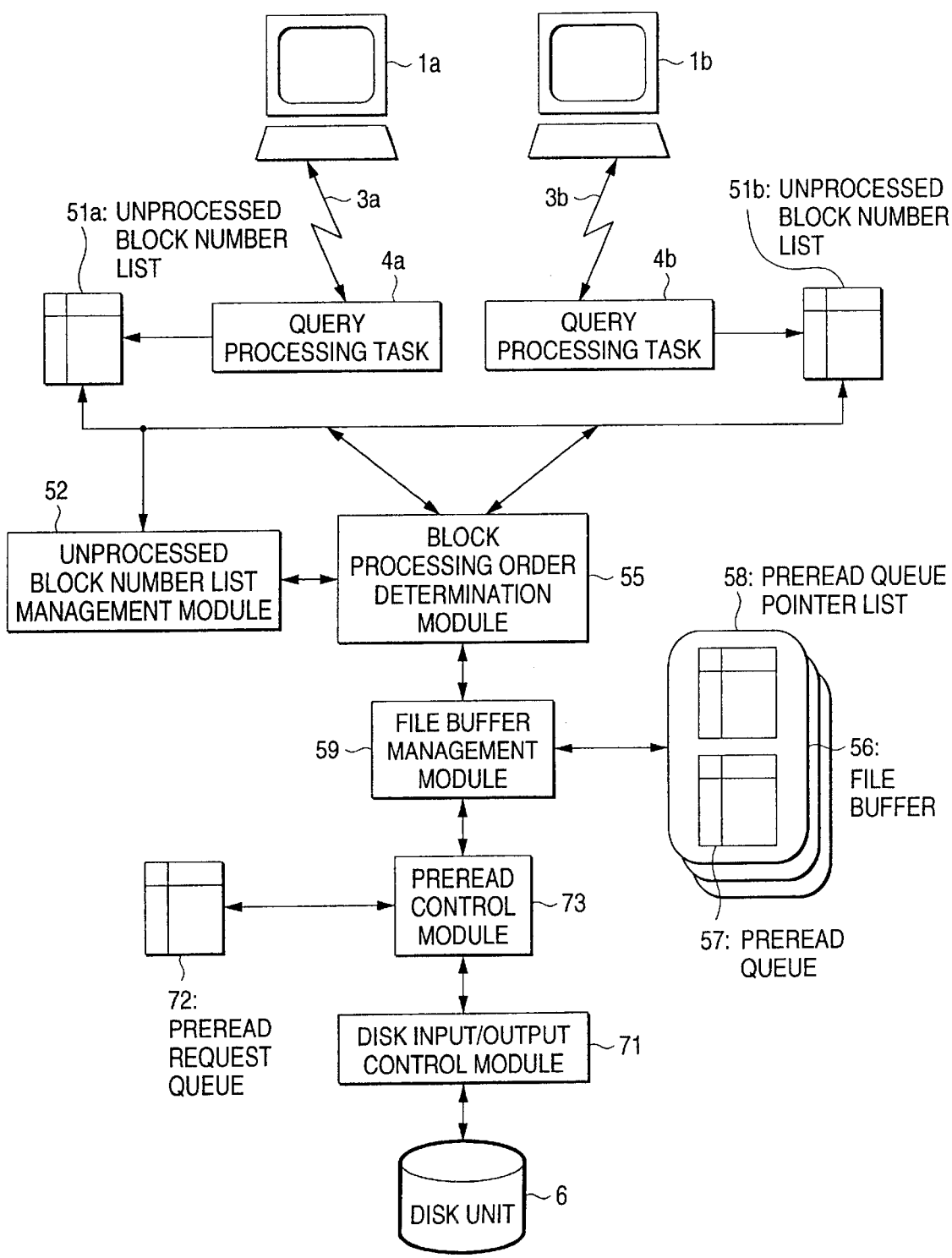
FIG. 6 is a functional block diagram of a database system in a second embodiment of the invention.

FIG. 6 is a functional block diagram of a database system to show a second embodiment of the invention. Parts identical with or similar to those previously described with reference to FIG. 2 are denoted by the same reference numerals in FIG. 6. Numeral 56 denotes a file buffer for storing a preread queue 57 for temporarily storing data read from a disk unit 6 and a preread queue pointer list 58, the preread queue 57 and the preread queue pointer list 58 being involved in read control. The file buffers 56 are provided in a one-to-one correspondence with files. Numeral 59 denotes a file buffer management module for managing the file buffers 56, numeral 72 denotes a preread request queue for storing a preread request, and numeral 73 denotes a preread control module for requesting a disk input/output control module 71 to read data requested in a preread request based on the preread request queue 72.

The file buffer management module 59 and the preread control module 73 are program modules executed by the CPU 2a in FIG. 1, query processing tasks 4a and 4b and the preread control module 73 are processed in parallel in separate threads or processes, and the file buffer management module 59 is a common routine called in the threads or processes. Unprocessed block number lists 51a and 51b, the file buffers 56, and the preread request queue 72 are stored in main memory 2d as shared memory that can be accessed among the threads or processes.

Figure 7:
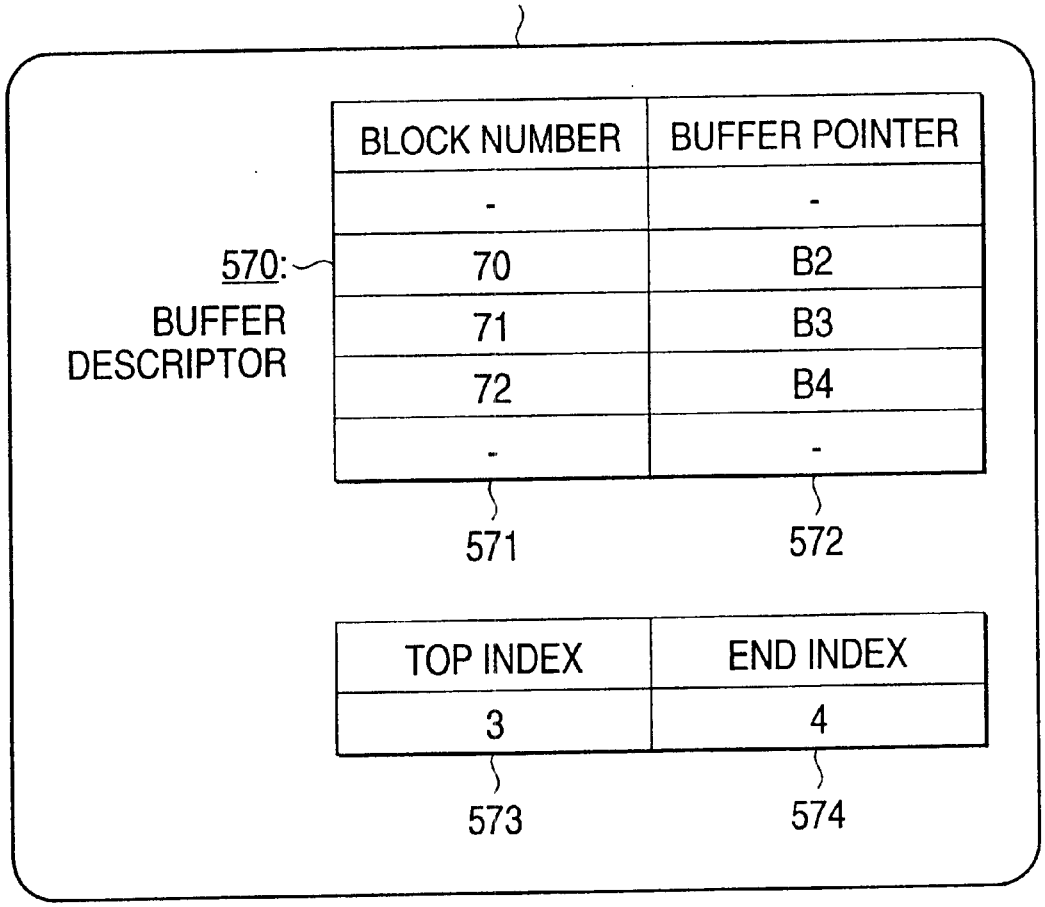
FIG. 7 is a memory map to show a preread queue in the second embodiment of the invention.

FIG. 7 is a drawing to show an example of the preread queue 57 provided as a ring buffer. The preread queue 57 is made up of a finite number of buffer descriptors 570, each of which stores a pair of a block number 571 and a buffer pointer 572 for pointing to the memory area in which the corresponding block is stored. The buffer descriptors 570 are used circularly in a first-in first-out manner; a top index 573 for indicating the buffer descriptor 570 corresponding to the oldest block read from the disk unit 6 and an end index 574 for indicating the buffer descriptor 570 corresponding to the most recent block read from the disk unit 6 are used to indicate the buffer descriptors where effective information is stored.

FIG. 8 is a drawing to show an example of the preread queue pointer list 58. The preread queue pointer list 58 stores a pair of a task number 581 and a preread queue pointer 582 pointing to the index of the buffer descriptor 570 where the next block to be processed by the task identified by the task number 581 is stored or to be stored for each of all query processing tasks 4a and 4b opening the corresponding file. For example, assuming that the task number 581 of the query processing task 4a is T1, the preread queue pointer 582 corresponding to the task number 581 is the first pointer and assuming that the task number 581 of the query processing task 4b is T3, the preread queue pointer 582 corresponding to the task number 581 is the second pointer.

FIG. 9 is a drawing to show an example of the preread request queue 72. The preread request queue 72 stores a set of a top block number 721, the number of blocks 722, and a file number 723 of the file formed of the block area for each of consecutive block areas on the disk unit 6.

Here, the query processing task 4a in FIG. 6 is an example of first processing means and detection means and the query processing task 4b is an example of second processing means and detection means. However, the detection means may be placed in any other module than the query processing task 4a or 4b, such as a block processing order determination module 55.

The file buffer management module 59 and the preread control module 73 are an example of buffer management means. The preread control module 73 is an example of preread means.

Figure 10:
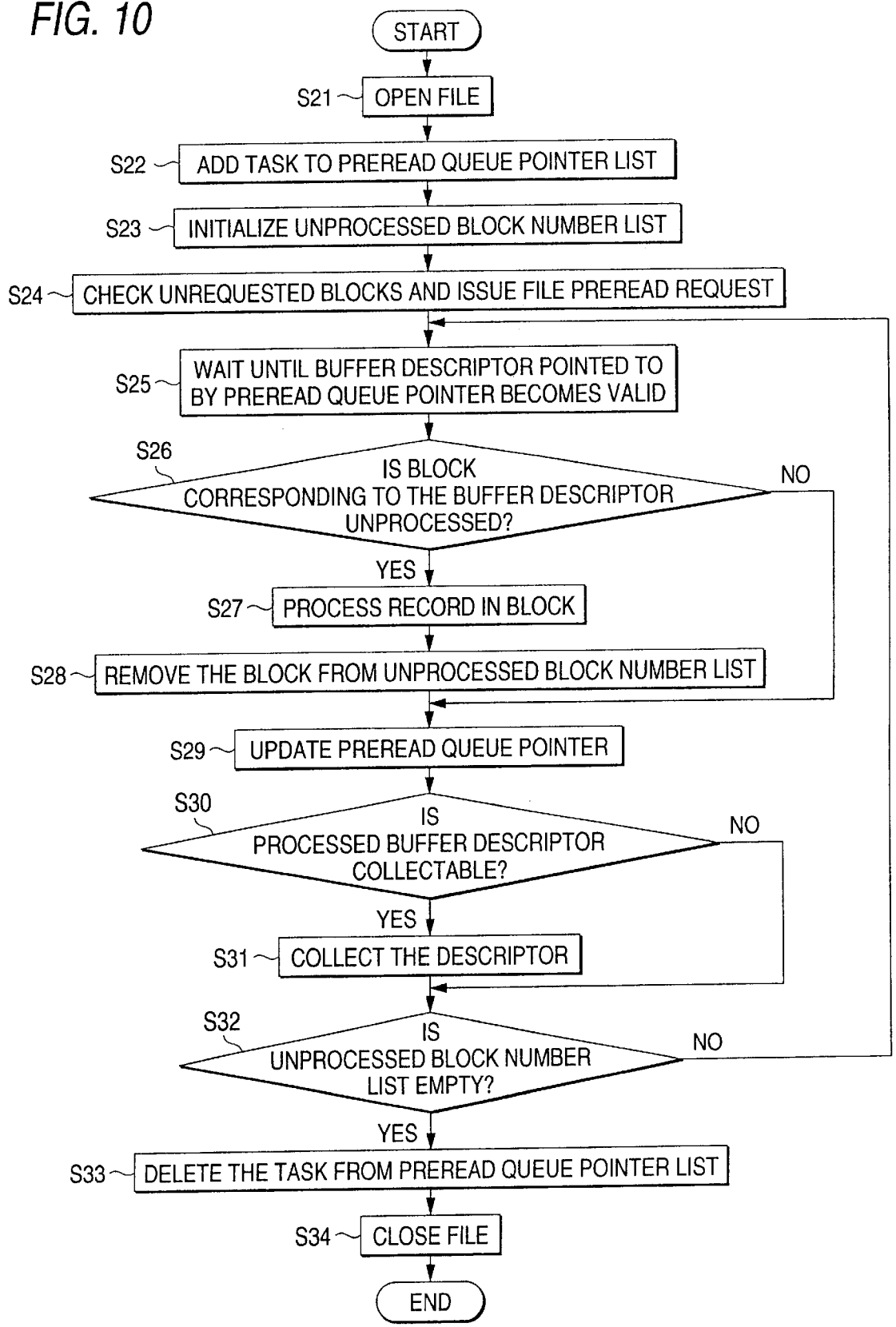
FIG. 10 is a flowchart to describe preread request processing in the second embodiment of the invention.

Next, the operation of the database system of the second embodiment will be discussed with reference to FIGS. 10 and 11 for the parts other than the preread control module 73 and the preread control module 73 separately. FIG. 10 is a flowchart to describe the operation of the parts other than the preread control module 73. First, at step S21 in FIG. 10, to process a database file, the query processing task 4a opens the file.

At step S21, before the query processing task 4a opens the file, it accepts a processing request and executes an acceptance step. In the description of the first embodiment, the query processing task 4a is covered; in fact, the step S21 is executed in each of the query processing tasks 4a and 4b. For example, if the query processing task 4a first executes step S21, the step S21 involved in the query processing task 4a becomes the first acceptance step for accepting the first processing request and step S21 involved in the query processing task 4b later executed becomes the second acceptance step for accepting the second processing request.

Next, at step S22, the file buffer management module 59 sets the task number of the query processing task 4a in the preread queue pointer list 58 of the file as the task number 581 and sets the top index 573 of the preread queue 57 of the file as the preread queue pointer 582.

Next, at step S23, the query processing task 4a sets a set of the block numbers required for query processing in the file in the unprocessed block number list 51a.

At step S24, the query processing task 4a finds block numbers contained in the unprocessed block number list 51a, but not in either the preread queue 57 or the preread request queue 72 and adds the result to the preread request queue 72 as a preread request.

Here, the step S24 is an example of the first or second request step. For example, if the query processing task 4a first starts the first acceptance step as described above, it executes the first request step at the step S24 and the query processing task 4b executed in another thread or process executes the second request step at the step S24.

Next, at step S25, when the query processing task 4a makes a block read request, the block processing order determination module 55 gets the contents of the preread queue pointer 582 corresponding to the query processing task 4a from the preread queue pointer list 58 and waits until the buffer descriptor 570 in the preread queue 57 pointed to by the contents of the preread queue pointer 582 becomes valid. Whether or not one buffer descriptor 570 is valid is determined by comparing the index of the buffer descriptor with the top index 573 and the end index 574 of the preread queue 57.

At step S26, the block processing order determination module 55 determines whether or not the block number 571 of the buffer descriptor 570 is contained in the unprocessed block number list 51a. If the block number is not contained in the list, control goes to step S29. If the block number is contained in the list, control goest to step S27 at which the block is determined the block to be processed, the contents of the buffer pointed to by the buffer pointer 572 of the buffer descriptor are returned to the query processing task 4a, and query processing on the block is performed in the query processing task 4a. That is, the query processing task 4a reads data from the file buffer 56 in the main memory 2d.

Here, the step S27 executed by the query processing task 4a is an example of the fourth read step, in which case the query processing task 4a becomes the first task. The step S27 executed by the query processing task 4b in another thread or process is an example of the fifth read step, in which case the query processing task 4b is the second task.

Next, at step S28, the unprocessed block number list management module 52 deletes the block number of the block processed at step S27 from the unprocessed block number list 51a.

At step S29, the contents of the preread queue pointer 582 corresponding to the query processing task 4a in the preread queue pointer list 58 are updated so as to point to the next buffer descriptor 570 in the preread queue 57.

Next, at step S30, the file buffer management module 59 determines whether or not the buffer descriptor 570 can be collected. If the buffer descriptor 570 cannot be collected, control goes to step 32. The conditions under which one buffer descriptor 570 becomes collectable are that the index indicating the buffer descriptor 570 should match the top index 573 of the preread queue 57 and that the preread queue pointer list 58 does not contain any task with the corresponding preread queue pointer 582 pointing to the buffer descriptor. When the conditions are true, all query processing tasks complete processing of the block corresponding to the buffer descriptor 570. That is, at step S30, whether or not the file buffer management module 59 determines whether all query processing tasks 4a and 4b complete processing of the block corresponding to the buffer descriptor 570.

If the buffer descriptor is collectable, control goes to step S31 at which the top index 573 of the preread queue 57 is updated so as to point to the buffer descriptor 570 next to the buffer descriptor 570, whereby the buffer descriptor 570 is collected. Therefore, the storage area in the main memory 2d pointed to by the buffer pointer 572 of the collected buffer descriptor 570 is made available to read the next data from the disk unit 6.

Next, at step S32, when the query processing task 4a makes a request for reading the next block, the block processing order determination module 55 determines whether or not the unprocessed block number list 51a is empty. If the unprocessed block number list 51a is not empty, the block processing order determination module 55 returns to step S25 and continues processing.

If the unprocessed block number list 51a is empty, control goes to step S33 at which the file buffer management module 59 deletes the setting related to the query processing task 4a from the preread queue pointer list 58. At step S34, the query processing task 4a closes the file and terminates processing of the file. The described processing flow is repeated for each of the files processed in the tasks. Although the description has been given centering on the query processing task 4a, similar processing is also performed with respect to the query processing task 4b. Here, the query processing tasks 4a and 4b are executed in parallel in different threads.

Figure 11:
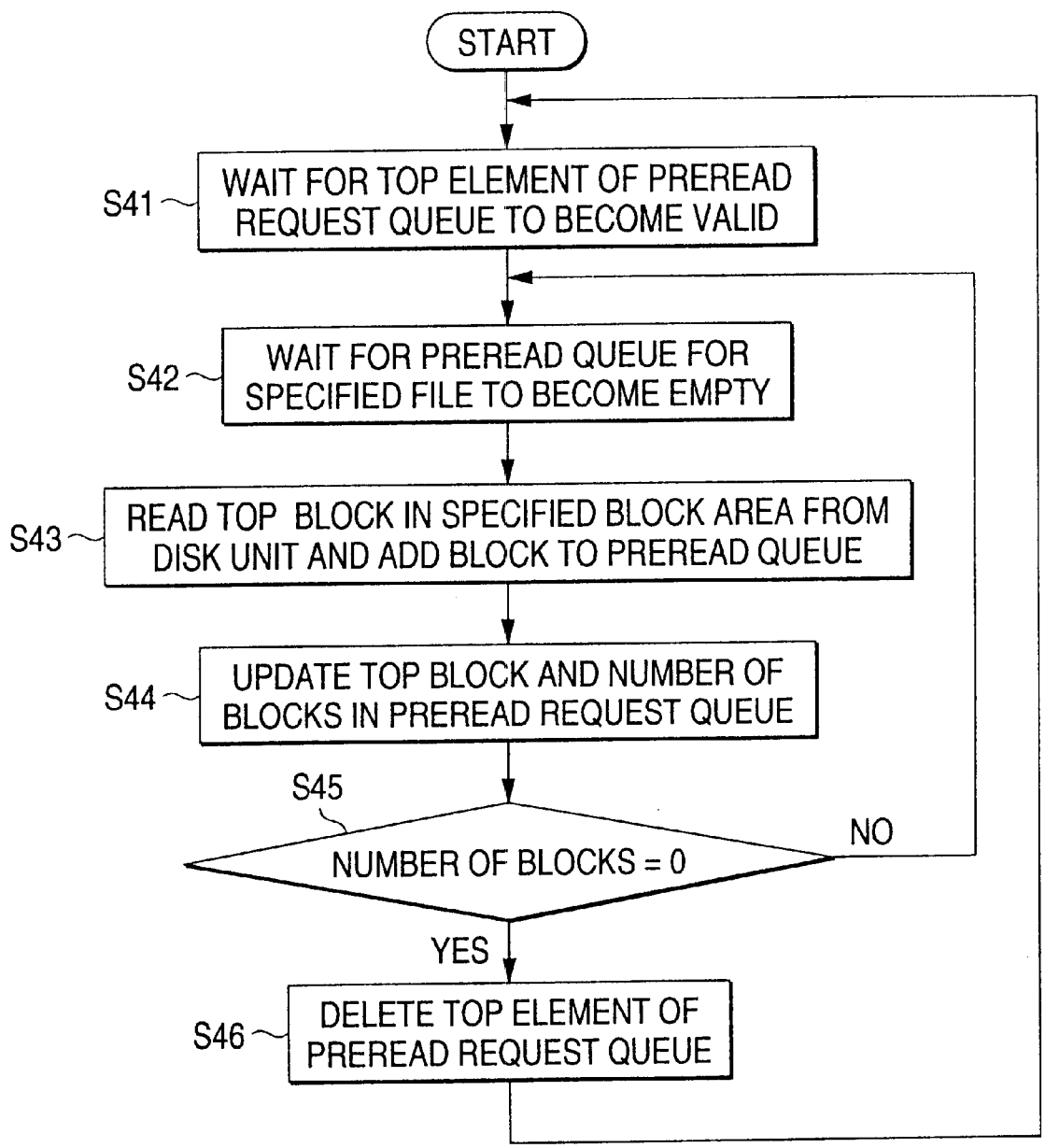
FIG. 11 is a flowchart to describe preread processing in the second embodiment of the invention.

FIG. 11 is a flowchart to describe the operation of the preread control module 73. First, at step S41 in FIG. 11, the preread control module 73 waits for the top element of the preread request queue 72 to become valid.

Next, at step S42, the preread control module 73 waits until an empty buffer descriptor occurs in the preread queue 57 for the file specified by the file number 723 in the top element. Whether or not an empty buffer descriptor 570 exists in the preread queue 57 is determined by comparing the top index 573 with the end index 574. As described above, the data common to a number of query requests is detected at step S30 in FIG. 10 and an empty buffer descriptor 570 is prepared at step S31. Since the preread control module 73 waits until an empty buffer descriptor 570 is prepared, data shared among a number of query requests can be prevented from being erased at step S43 described later before processing terminates. Therefore, it is not necessary to again read the common data into the file buffer 56 from the disk unit 6, so that physical data transfer to and from the disk unit can be reduced and processing can be performed with the minimum necessary disk access.

Next, at step S43, the preread control module 73 reads the block specified by the top block number 721 in the top element from the disk unit 6, then stores the read block in the memory area pointed to by the buffer pointer 572 of the buffer descriptor 570 following the buffer descriptor 570 indicated by the end index 574 in the preread queue 57 and sets the block number 571 to the value of the top block number 721. This step S43 is an example of the first storage step.

At step S44, the preread control module 73 increments the top block number 721 in the top element by one and decrements the number of blocks 722 by one.

Next, at step S45, the preread control module 73 determined whether or not the number of blocks 722 equals zero. If the number of blocks 722 does not equal zero, the preread control module 73 returns to step S42.

If the number of blocks 722 equals zero, control goes to step S46 at which the preread control module 73 deletes the top element from the preread request queue 72, sets the next element to the top element, and returns to step S41.

The described processing flow is repeated while the database system 2 operates.

Here, the sixth read step will be discussed. Whether or not the fourth and fifth read steps terminate for each storage area of the buffer storage means is determined at step S30 previously described with reference to FIG. 10. If the fourth and fifth read steps do not terminate, no buffer descriptor is collected at step S31 and an empty buffer descriptor is not provided. Then, at step S43 in FIG. 11, the preread control module 73 does not substitute data for the data stored in the storage area and if another empty area is not available on the buffer storage means, the preread control module 73 waits until the fourth and fifth read steps terminate. If it is determined at step S30 that the fourth and fifth read steps terminate, buffer descriptor is collected at step S31 in FIG. 10 and becomes an empty buffer descriptor. Thus, at step S43 in FIG. 11, the preread control module 73 substitutes new data read at the sixth read step for the data stored in the storage area.

As described above, in the invention, the file buffers each consisting of a preread queue and a preread queue pointer list and the preread control module are provided, so that the block processing order in each file can be determined easily, the block whose processing is complete can be collected immediately, and the fruitless time between one disk read operation and another which are consecutive can be reduced. The first-in first-out buffer is shared among a number of processing requests for using the buffer area efficiently. If common data is unprocessed in another processing request, the query processing task involved in one processing request can be prevented from erasing the common data.

Third Embodiment

A third embodiment of the invention relates to a determination method of a preread request insertion position into a preread request queue 72. If a query contains join operation or a subquery, more than one file is searched in one query. Therefore, if accessed files include a common portion in a number of queries, the processing order in file units needs to be determined appropriately so as to reduce reading of the common files separately from a disk unit 6.

Since a preread request is issued for a block area represented by a top block number 721 and number of blocks 722, it takes hours in processing a request corresponding to the large number of blocks 722 and meanwhile other requests are made to wait. Then, the preread request priorities are assigned in response to the magnitude of the number of blocks 722 and the insertion positions into the preread request queue 72 are determined so that processing is started at the preread request having the smallest number of blocks 722.

The third embodiment is provided by slightly changing the operation of the query processing tasks 4a and 4b in the second embodiment described above; a system of the third embodiment is similar to that of the second embodiment except in the point described below.

Step S43 in FIG. 11 is an example of the seventh to ninth read steps in the third embodiment. The query processing tasks 4a and 4b in FIG. 6 also serve as priority determination means in the third embodiment. However, the priority determination means may be placed in any other module than the query processing task 4a or 4b, such as a block processing order determination module 55. Further, the disk input/output control module 71 and the preread control module 73 in FIG. 6 are an example of read means.

Figure 12:
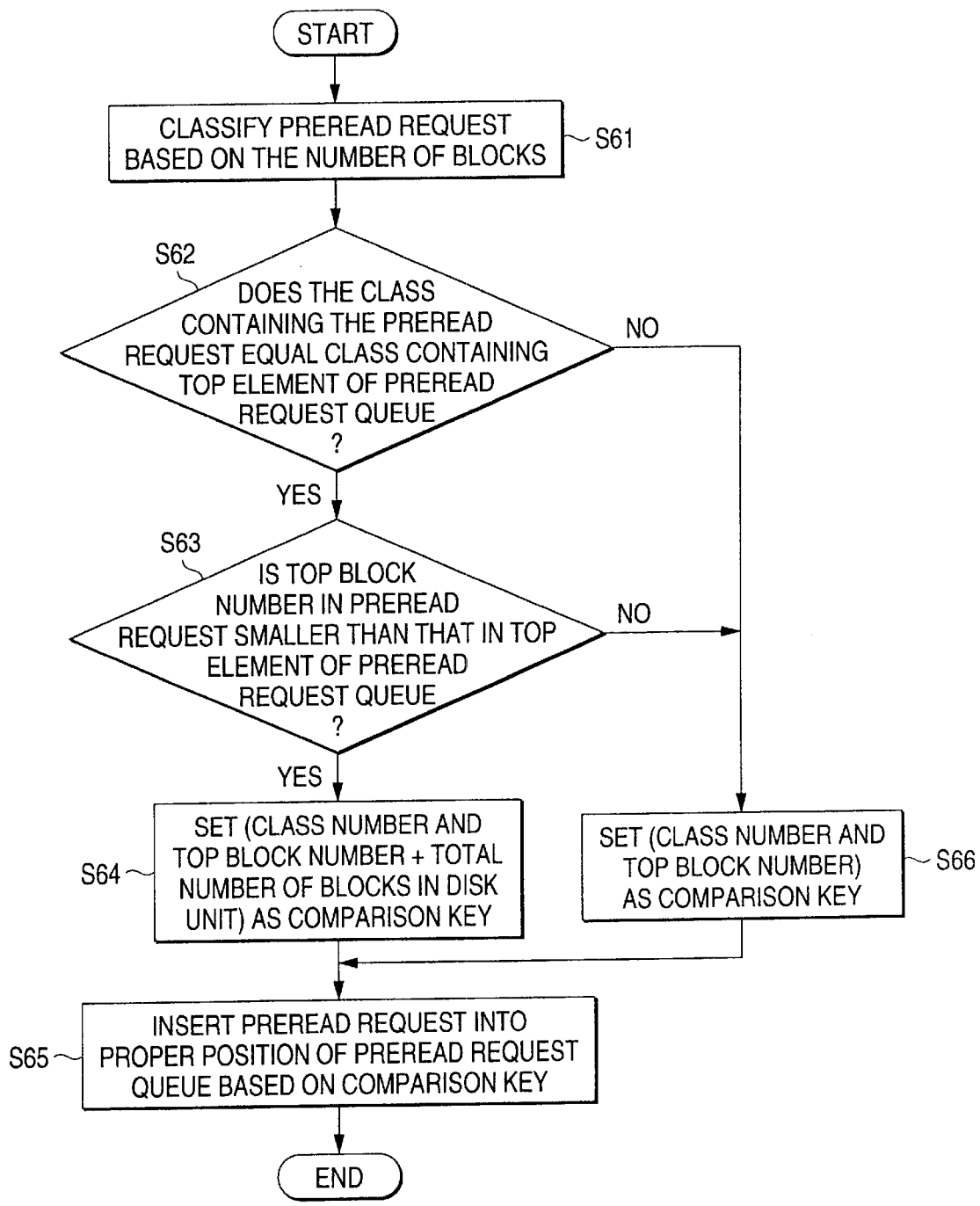
FIG. 12 is a flowchart to describe preread request processing in a third embodiment of the invention.

FIG. 12 is a flowchart to describe an insertion position determination method of preread requests into the preread request queue 72 by the query processing task 4a, 4b; it shows step S24 in FIG. 10 in detail. First, at step S61 in FIG. 12, each preread request is classified into any of classes based on the range of the number of blocks 722. The number of classes can be set as required; for example, to classify preread requests into two classes, preread requests corresponding to less than 100000 blocks can be classified under class 1 and preread requests corresponding to 100000 or more blocks can be classified under class 2. The classes are given class numbers in the ascending order of the numbers of blocks in the requests contained in the classes.

Figure 13:
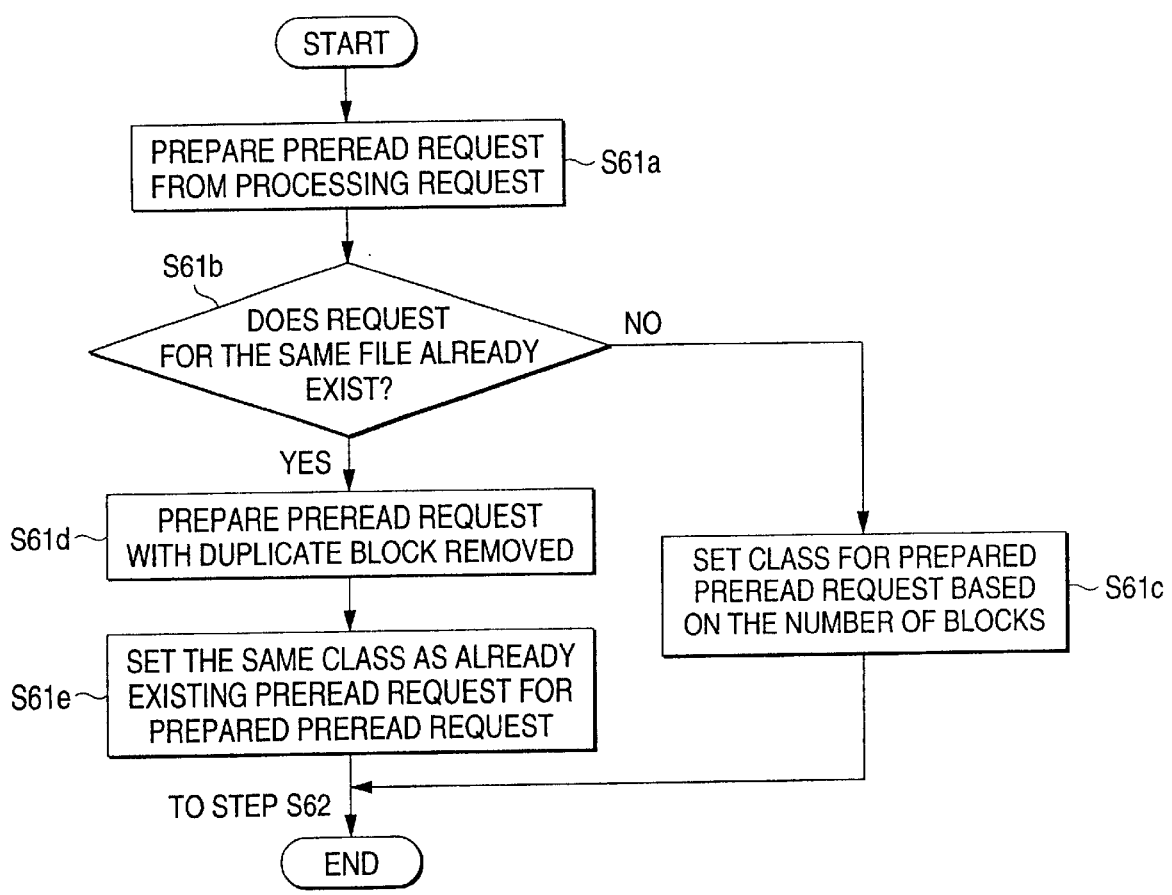
FIG. 13 is a flowchart to describe preread request processing in the third embodiment of the invention.

FIG. 13 is a flowchart to show step S61 in FIG. 12 in detail. First, at step S61a, the query processing task 4a checks the file number, the top block number, and the number of blocks required for a new accepted processing request.

Next, at step S61b, the query processing task 4a determines whether or not the file number of the processing request prepared at step S61a is the same as a file number 723 of a preread request 720 stored in the preread request queue 72. If the file number is not the same as the file number 723, the query processing task 4a goes to step S61c and sets a class for the preread request prepared at step S61a based on the number of blocks checked at step S61a as described above. When step S61c terminates, control makes a transition to step S62 in FIG. 12.

On the other hand, if it is determined at step S61b that the file number is the same as the file number 723, control goes to step S61d at which the query processing task 4a checks whether or not a duplicate block exists between the preread request prepared at step S61a and the preread request 720 stored in the preread request queue 72, and again prepares a preread request with the duplicate block removed.

Next, at step S61e, the query processing task 4a assigns the same class as the same file detected at step S61b to the preread request prepared at step S61d, then control goes to step S62 in FIG. 12.

The reason why whether or not the same file exists is determined at step S61b and a class is set based on the result is as follows: If preread requests are classified simply according to the numbers of blocks, preread request 720 with the decreased number of blocks results from deleting duplicate blocks as at step S61d, and data not common to two processing requests is first read. Considering the whole processing efficiency of tasks, often the processing efficiency worsens. At step S61, whether or not the same file exists is checked and a class is set based on the result, thus the data common to two processing requests can be read from the disk unit 6 taking precedence over any other data.

At step S61, each preread request is classified into any of classes as an example of comparison step, but any configuration may be adopted if the data amount related to the first processing request can be compared with that related to the second processing request.

Although the description has been given centering on the query processing task 4a, the processing previously described with reference to FIG. 13 is also performed with respect to the query processing task 4b.

At step S62, whether or not the class number of the class containing the preread request equals the class number of the class containing the top element of the preread request queue 72 is determined. If they do not equal, control goes to step S66. If they equal, control goes to step S63 and whether or not the top block number in the preread request is smaller than the top block number in the top element of the preread request queue 72 is determined. If the former top block number is not smaller than the latter, control goes to step S66. If the former is smaller than the latter, control goes to step S64 and a combination of the class number and the total number of blocks in the disk unit 6 added to the top block number 721 is set as a comparison key.

At step S65, the insertion position of the preread request into the preread request queue 72 is determined so that the preread requests are placed in the ascending order of the comparison keys of the preread requests and the preread request is inserted into the preread request queue 72, then the processing is terminated.

If the conditions at steps S62 and S63 are not true, control goes to step S66 and a combination of the class number and the top block number 721 is set as a comparison key and control goes to step S65.

Figure 14:
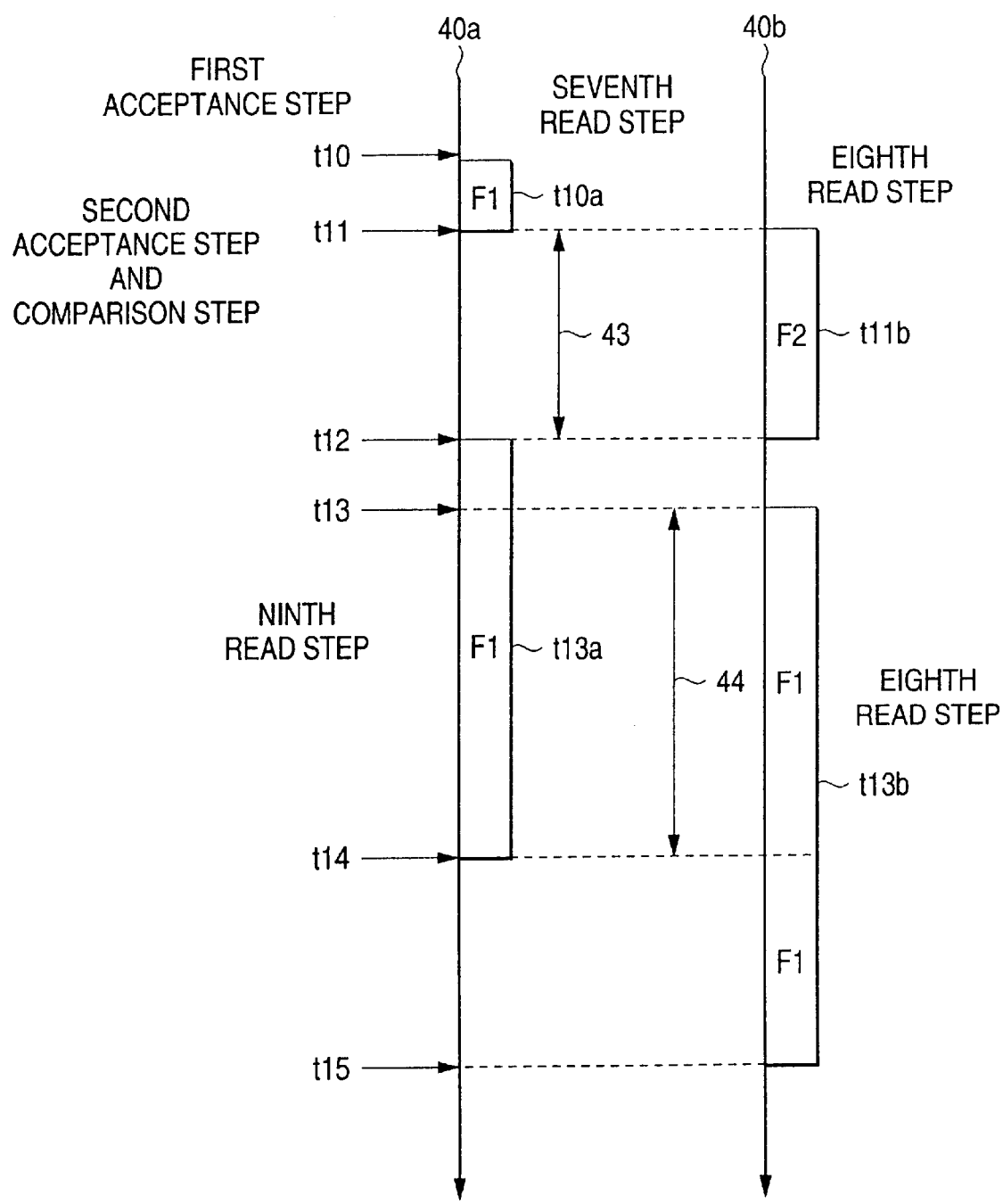
FIG. 14 is a sequence chart to describe read processing in the third embodiment of the invention.

If query processing on a comparatively small file F2 occurs while the query processing task 4a processes a file F1, the query processing task 4 processes the file F2 taking precedence over other files and then successively processes the file F1. The operation executed at this time will be discussed with reference to FIG. 14, which is a time sequence chart. In FIG. 14, numerals 40a and 40b denote block processing sequences of the query processing tasks 4a and 4b respectively as those in FIG. 5. Symbols t11, t12, t13, and t14 denote timings.

At timing t11, the query processing task 4a already accepts the first processing request and terminates the first acceptance step, namely, is processing the file F1 related to the first processing request. At this time, as shown at t10a, data is read into a file buffer 56 from the disk unit 6 and the seventh read step is executed.

Here, assume that at t11, the query processing task 4b accepts the second processing request and that query processing on the file F2 related to the second processing request occurs. The query processing task 4b starts processing for the new occurring query processing. In this example, the class number to which the number of blocks of unprocessed block area of the file F1 belongs is greater than that to which the number of blocks of unprocessed block area of the file F2 belongs. Therefore, according to the processing previously described with reference to FIG. 12, the file F2 preread request issued by the query processing task 4b is inserted into the top of the preread request queue 72 and the file F1 preread request becomes the second element.

Thus, at timing t11, the query processing task 4b executes a comparison step and the file F2 preread request is inserted into the top of the preread request queue 72. A preread control module 73 issues a request for reading a block of the file F2 to a disk input/output control module 71. In the time period from timing t11 to timing t12, the preread control module 73 reads the file F2. Thus, the query processing task 4a interrupts processing and the query processing task 4b performs processing. That is, in the time period from timing t11 to timing t12, the eighth read step is executed as shown at t11b.

At timing t12, when the query processing task 4b completes processing of all blocks of the file F2, the file F2 preread request is deleted from the top of the preread request queue 72 and the file F1 preread request again becomes the top element.

In the time period from timing t12 to timing t13, the preread control module 73 reads the file F1 and the query processing task 4a restarts processing. At timing t13, the query processing task 4b starts parallel processing of the file F1.

In the time period from timing t13 to timing t14, the query processing tasks 4a and 4b process the file F1 block read by the preread control module 73. At timing t14, the query processing task 4b completes processing of all blocks. Therefore, in the time period from timing t12 to timing t14, the disk input/output control module 71, the preread control module 73, and the query processing task 4a execute the ninth read step.

In the time period from timing t14 to timing t15, the query processing task 4b processes an unprocessed block of the file F1 solely and at timing t15, completes processing of all blocks. Therefore, in the time period from timing t13 to timing t15, the disk input/output control module 71, the preread control module 73, and the query processing task 4b execute the eighth read step.

Figure 15:
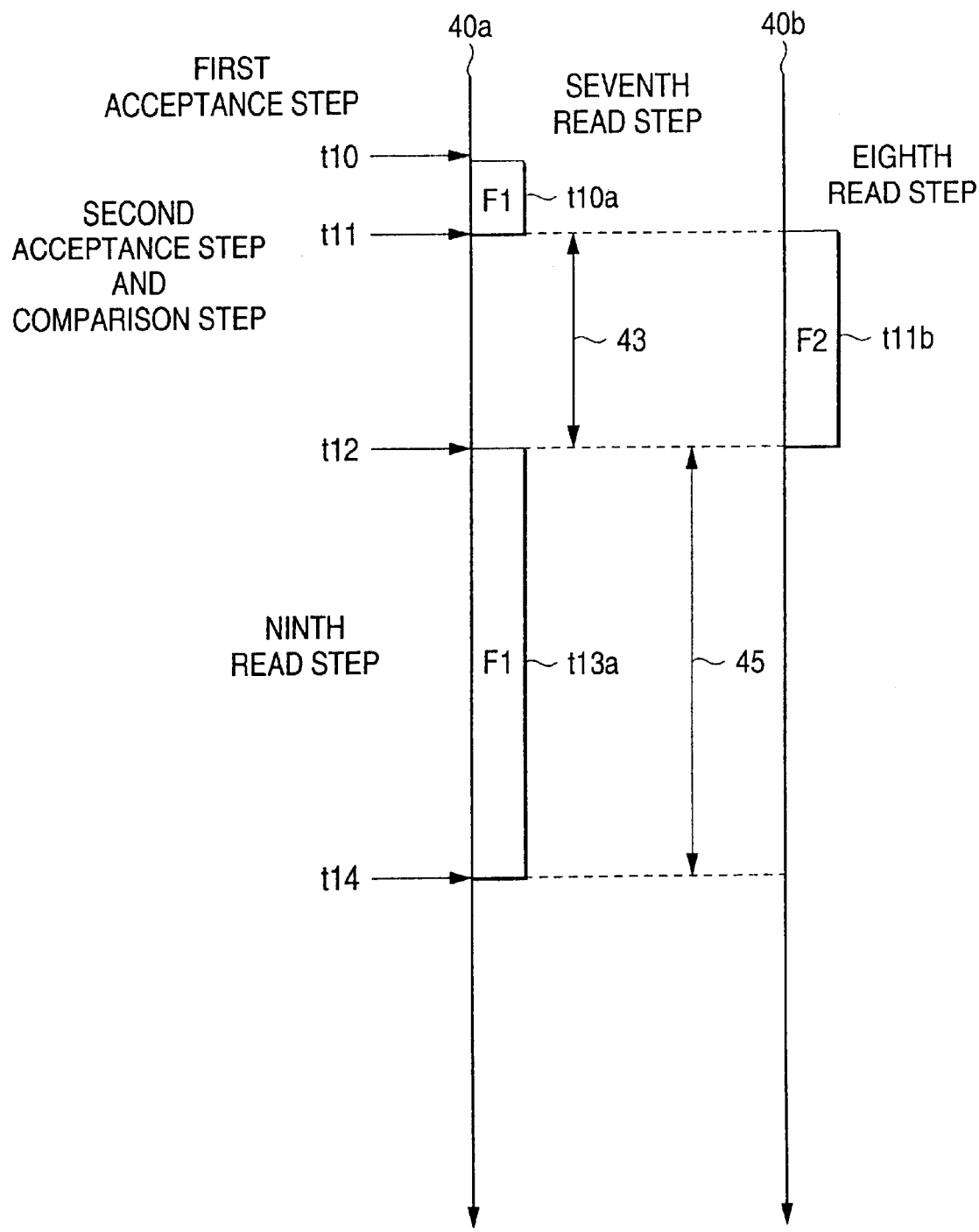
FIG. 15 is a sequence chart to describe read processing in the third embodiment of the invention.
Figure 16:
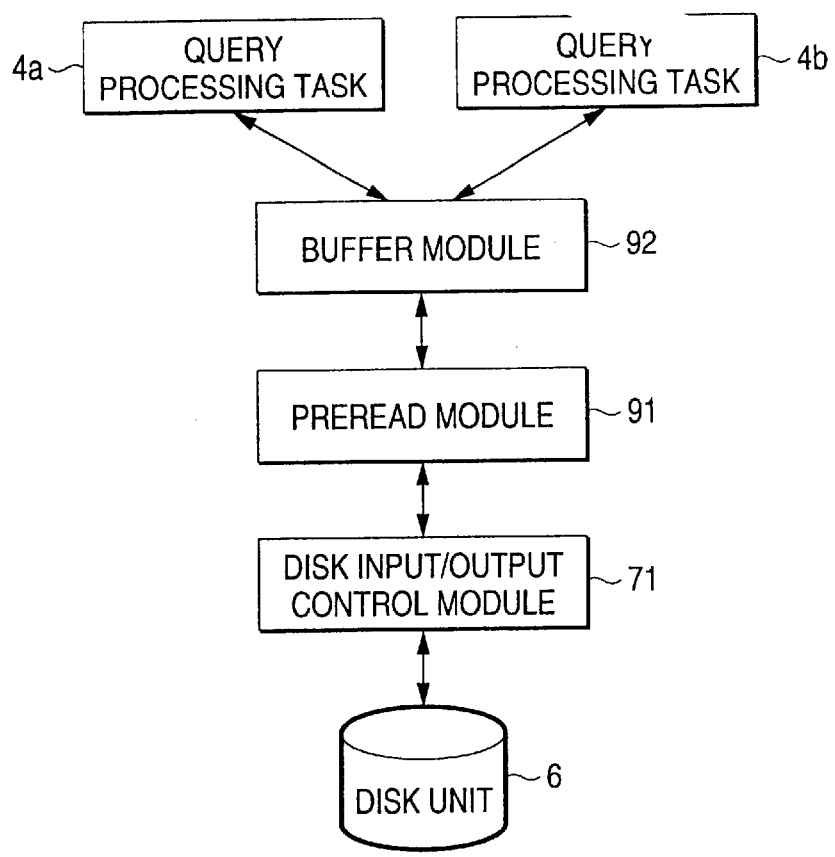
FIG. 16 is a functional block diagram to show a database system in a related art.
Figure 17:
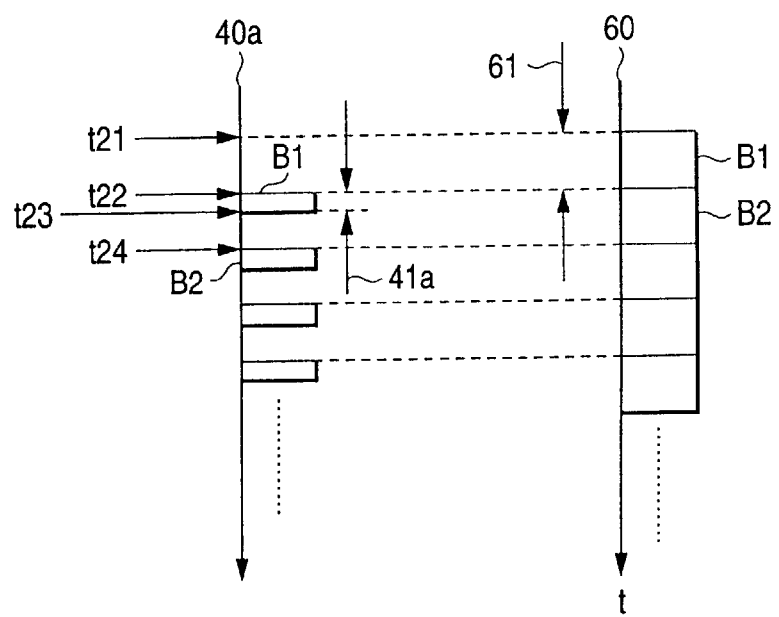
FIG. 17 is a sequence chart to show read processing in the related art.

In the description previously given with reference to FIG. 14, there is more than one file related to the second processing request. If one file related to the second processing request exists, processing is performed as shown in FIG. 15, which is a sequence chart. Timings, etc., identical with or similar to those previously described with reference to FIG. 14 are denoted by the same symbols (reference numerals) in FIG. 15.

As shown in FIG. 15, according to the operation previously described with reference to FIGS. 10 to 13, if one file related to the second processing request exists, the eighth read step terminates before the ninth read step is started.

As described above, in the operation in FIG. 13 or 14, the execution time of the query processing task 4*a* is made longer by time 43 as compared with the case where the query processing task 4*a* operates solely, but the execution time of the query processing task 4*b* is made shorter by time 44 or 45. If the time 43 is not smaller than the time 44 or 45, replacement of the top element of the preread request queue at timing till does not occur, thus the average query processing task execution time is shortened.

As described above, in the described invention, particularly the preread requests are classified according to the number of blocks involved in each preread request and the preread priority is determined based on the class. Thus, the response time to processing of a small file can be decreased and if some of a number of files processed by a number of query processing tasks contain a common portion, the occasion where the files containing the common portion are processed in parallel can be increased.

The invention, which is configured as described above, provides the following advantages:

The information processing system according to one aspect of the invention comprises buffer storage means for temporarily storing a plurality of data pieces read from a storage unit, order determination means for detecting from a processing request for requesting a plurality of data pieces stored on the storage unit, the data piece matching the data stored in the buffer storage means among the data pieces requested in the processing request and determining the read order of the match data piece and the remaining data requested in the processing request so as to read the match data piece preceding the remaining data, and read means for reading the match data piece from the buffer storage means before reading the remaining data into the buffer storage means from the storage unit in accordance with the read order determined by the order determination means. Thus, access through the buffer can be executed at high speed.

The storage unit is a disk unit, the read means reads the remaining data into the buffer storage means from the disk unit after reading the match data piece, and the information processing system further includes transmission means for transmitting the remaining data after transmitting the match data piece read by the read means from the buffer storage means. Thus, the data stored in the buffer can be used effectively and the number of times the disk unit is accessed can be decreased.

The information processing system according to another aspect of the invention comprises a disk unit with a storage area divided into a plurality of blocks, buffer storage means for storing a plurality of blocks read from the disk unit, first processing means for accepting a first processing request for requesting a plurality of data pieces stored on the disk unit, detecting a plurality of blocks storing the data pieces requested in the first processing request based on the first processing request, and reading the data in the detected blocks from the buffer storage means, second processing means for accepting a second processing request for requesting a plurality of data pieces stored on the disk unit, detecting a plurality of blocks storing the data pieces requested in the second processing request based on the second processing request, and reading the data in the detected blocks from the buffer storage means, detection means for detecting a block common to the first and second processing requests among the blocks stored in the buffer storage means, and buffer management means, to erase the data contained in the common block detected by the detection means from the buffer storage means, for erasing the data after the data to be erased is read by both the first and second processing means. Thus, access through the buffer can be executed at high speed.

The buffer management means comprises preread means for reading the data in the blocks detected by the first processing means and data in a block specified in a read request received from the outside from the disk unit and stores the read data in the buffer storage means, and the detection means specifies a block not common to the blocks related to the first processing request without specifying the common block among the blocks detected by the second processing means and outputs to the preread means as the read request. Thus, duplicate read requests can be suppressed and the number of times the disk unit is accessed can be decreased.

The buffer storage means stores the data pieces requested in the first and second processing requests in a first-in first-out shared queue, the preread means stores the data in the common block read from the disk unit in the queue, the first processing means reads the data requested in the first processing request based on a first pointer for pointing to one location in a storage area of the queue, and the second processing means reads the data requested in the first processing request based on a second pointer for pointing to one location in the storage area of the queue. Thus, the queue can be shared between two processing requests and the buffer storage capacity can be saved.

The information processing system according to another aspect of the invention comprises buffer storage means for temporarily storing a plurality of common data pieces to a plurality of processing requests, read means for reading new data from a storage unit, and buffer management means for substituting the new data for the common data having been processed for the processing requests without substituting the new data for unprocessed common data having not yet been processed for at least one of the processing requests among the common data pieces stored in the buffer storage means. Thus, access through the buffer can be executed at high speed.

The buffer management means stops writing into the buffer storage means if all common data pieces stored in the buffer storage means are unprocessed command data and an empty storage area is not available. Thus, the data shared among processing requests can be prevented from being replaced with any other data without being processed.

The information processing system according to another aspect of the invention comprises priority determination means for accepting a first processing request for requesting data and a second processing request for requesting a smaller amount of data than that in the first processing request and assigning a high priority to the second processing request involving a smaller data amount between the first and second processing requests and a lower priority than that of the second processing request to the first processing request involving a larger data amount as compared with the second processing request based on the data amounts of the data requested in the first and second processing requests, and read means for reading the data in the processing request assigned the high priority from a storage unit taking precedence over data in any other processing request based on the priorities. Thus, access through the buffer can be executed at high speed.

The priority determination means determines the priority of the first processing request based on a predetermined data amount and the data amount involved in the first processing request and the priority of the second processing request based on the predetermined data amount and the data amount involved in the second processing request. Thus, the processing requests can be managed under classes and frequent change of the execution order in the same class and delaying of a response can be suppressed.

If the priority determination means accepts the second processing request later while the read means reads the first processing request, it again determines the priorities from the beginning, and the read means interrupts reading of the data requested in the first processing request and reads the data requested in the second processing request based on the priorities again determined by the priority determination means, and restarts reading of the data requested in the first processing request after completion of reading the data requested in the second processing request. Thus, access through the buffer can be executed at higher speed.

The first and second processing requests are requests for accessing different files, and the read means reads the file related to the first processing request and the file related to the second processing request based on the priorities. Thus, file access through the buffer can be executed at high speed.

According to another aspect of the invention, there is provided a recording medium recording a program for causing a computer to execute the acceptance step of accepting a processing request for requesting a plurality of data pieces on a storage unit, the determination step of determining whether or not data matching the data requested in the processing request is stored in buffer storage means for temporarily storing data read from the storage unit, the first read step of reading the match data from the buffer storage means based on the determination result at the determination step, the second read step of reading an unread data piece of the data pieces requested in the processing request into the buffer storage means from the storage unit after termination of the first read step, and the third read step of reading the data piece read at the second read step from the buffer storage means. Thus, access through the buffer can be executed at high speed.

The recording medium records the program for causing the computer to further execute the first transmission step, wherein processing is started between the first and second read steps, of transmitting the data read at the first read step to the requesting party making the processing request, and the second transmission step of transmitting the data read at the third read step to the requesting party. Thus, high-speed transmission can be executed starting at the data that can be transmitted independently of the request order.

According to another aspect of the invention, there is provided a recording medium recording a program for causing a computer to execute the acceptance step of accepting a plurality of processing requests, the first storage step of reading common data to the processing requests from a storage unit and storing the common data in buffer storage means for temporarily storing data, the fourth read step at which a first task for processing one of the processing requests reads the common data stored at the first storage step from the buffer storage means, the fifth read step at which a second task for processing one of the processing requests reads the common data stored at the first storage step from the buffer storage means, and the sixth read step being executed after termination of the first storage step, of sensing whether or not the fourth and fifth read steps terminate, if the fourth and fifth read steps terminate, the sixth read step of reading data from the storage unit and substituting the data read from the storage unit for the common data stored in the area of the buffer storage area, if the fourth and fifth read steps do not terminate, the sixth read step of temporarily stopping the substituting of the data. Thus, access through the buffer can be executed at high speed.

The acceptance step comprises the first acceptance step of accepting a first processing request as one of the processing requests, the first request step of making a request for reading data related to the first processing request accepted at the first acceptance step, the second acceptance step being executed after the first acceptance step, of accepting a second processing request as one of the processing requests, and the second request step of making a request for reading a data piece of a plurality of data pieces related to the second processing request accepted at the second acceptance step, not matching the data related to the first processing request, and the sixth read step includes reading the data requested at the first and second request steps into the buffer storage means from the storage unit. Thus, the buffer can be used effectively among processing requests and access through the buffer can be executed at high speed.

According to another aspect of the invention, there is provided a recording medium recording a program for causing a computer to execute the first acceptance step of accepting a first processing request for requesting data, the seventh read step of reading data related to the first processing request into buffer storage means from a disk unit, the second acceptance step of accepting a second processing request for requesting data during execution of the seventh read step, the comparison step being executed after the second acceptance step, of comparing the data amount involved in the first processing request with that in the second processing request in magnitude, the eighth read step of interrupting the seventh read step, reading data related to the second processing request from the disk unit, and transmitting the read data to the requesting party making the second processing request if the data amount involved in the second processing request is smaller than that in the first processing request based on the comparison result at the comparison step, and the ninth read step being executed after termination of the eighth read step, of restarting execution of the seventh read step interrupted. Thus, access through the buffer can be executed at high speed.

The second processing request is a processing request for accessing a plurality of files, the comparison step includes sorting a file related to the first processing request and the files related to the second processing request according to the access order in the ascending order of file sizes of the files, the eighth read step includes reading the files related to the second processing request into the buffer storage means from the disk unit in accordance with the access order and transmitting data in the read files to the requesting party, and even if the eighth read step is not yet complete, if the eighth read step accesses a file common to the first processing request, the ninth read step reads data in the common file from the buffer storage means. Thus, preread can also be started at the file that can be processed early among the files involved in one processing request.

At the eighth read step, an unprocessed block of a plurality of blocks in the common file is read taking precedence over other blocks into the buffer storage means from the disk unit by a task for processing the first processing request and then a block unprocessed for the second processing request is read into the buffer storage means from the disk unit. Thus, processing of a processing request assigned a low priority can also be started early.

What is claimed is:

1. An information processing system comprising:

priority determination means for accepting a first processing request for requesting data and a second processing request for requesting a smaller quantity of data than in the first processing request and assigning a priority to the second processing request higher than the priority of the first processing request involving a larger data quantity based on the data quantities requested in the first and second processing requests; and read means for reading the data in the processing request assigned the higher priority from a storage unit, in precedence over data in any other processing request.

2. The information processing system as claimed in claim 1, wherein said priority determination means determines the priority of the first processing request based on a threshold data quantity and the data quantity involved in the first processing request and the priority of the second processing request based on the threshold data quantity and the data quantity involved in the second processing request.

3. The information processing system as claimed in claim 1, wherein if said priority determination means accepts the second processing request later while said read means is reading the first processing request, said priority determination means again determines the priorities, and said read means interrupts reading of the data requested in the first processing request and reads the data requested in the second processing request based on the priorities again determined by said priority determination means, and restarts reading of the data requested in the first processing request after completion of reading the data requested in the second processing request.

4. The information processing system as claimed in claim 1, wherein the first and second processing requests are requests for accessing different files, and said read means reads a file related to the first processing request and a file related to the second processing request based on the priorities of the first and second processing requests.

5. A recording medium recording a program for causing a computer to execute:

a first acceptance step accepting a first processing request for requesting data;

a first read step reading data related to the first processing request into buffer storage means from a disk unit;

a second acceptance step accepting a second processing request for requesting data during execution of said first read step;

a comparison step executed after said second acceptance step, comparing a first data quantity involved in the first processing request with a second data quantity involved in the second processing request;

a second read step interrupting said first read step, reading data related to the second processing request from the disk unit, and transmitting the read data to a requesting party making the second processing request if the second data quantity is smaller than the first data quantity; and a third read step executed after termination of said second read step, restarting execution of said first read step that was interrupted.

6. The recording medium as claimed in claim 5, wherein the second processing request is a processing request for accessing a plurality of files, said comparison step includes sorting a file related to the first processing request and files related to the second processing request according to an access order in ascending order of sizes of the files, said second read step includes reading the files related to the second processing request into the buffer storage means from the disk unit in the access order and transmitting data in the files read to the requesting party, and even if said second read step is not yet complete, if said second read step accesses a file common to the first processing request, said third read step reads data in the file common to the first processing request from the buffer storage means.

7. The recording medium as claimed in claim 6, wherein at said second read step, an unprocessed block of a plurality of blocks in the file common to the first processing request is read, taking precedence over other blocks, into the buffer storage means from the disk unit by a task for processing the first processing request and then a block unprocessed for the second processing request is read into the buffer storage means from the disk unit.

* * * * *